United States Patent
Shinbo

(10) Patent No.: US 7,515,337 B2
(45) Date of Patent: Apr. 7, 2009

(54) SCREEN, MANUFACTURING METHOD OF SCREEN, AND PROJECTOR

(75) Inventor: Akira Shinbo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 392 days.

(21) Appl. No.: 11/167,250

(22) Filed: Jun. 28, 2005

(65) Prior Publication Data
US 2006/0087732 A1 Apr. 27, 2006

(30) Foreign Application Priority Data
Oct. 27, 2004 (JP) .............................. 2004-311859

(51) Int. Cl.
G03B 21/60 (2006.01)
(52) U.S. Cl. ..................................... 359/455
(58) Field of Classification Search ................ 359/443, 359/455–457, 460
See application file for complete search history.

(56) References Cited

U.S. PATENT DOCUMENTS

| | | | |
|---|---|---|---|
| 4,923,280 A * | 5/1990 | Clausen et al. | 359/456 |
| 4,936,652 A * | 6/1990 | Clausen et al. | 359/456 |
| 5,760,955 A * | 6/1998 | Goldenberg et al. | 359/456 |
| 6,151,162 A * | 11/2000 | Van De Ven | 359/443 |
| 6,776,935 B2 | 8/2004 | Anderson et al. | |
| 6,822,707 B2 | 11/2004 | Ariyoshi et al. | |
| 6,822,792 B2 * | 11/2004 | Goto | 359/456 |
| 6,937,393 B2 * | 8/2005 | Kim et al. | 359/457 |
| 7,050,227 B2 * | 5/2006 | Olofson et al. | 359/443 |

FOREIGN PATENT DOCUMENTS

| | | |
|---|---|---|
| CN | 1377467 A | 10/2002 |
| JP | 49-2533 | 1/1974 |
| JP | A-49-16432 | 2/1974 |
| JP | U-55-130336 | 9/1980 |
| JP | A-59-133532 | 7/1984 |
| JP | A-02-118560 | 5/1990 |
| JP | A 2-304542 | 12/1990 |
| JP | A-06-194741 | 7/1994 |
| JP | 06-289492 | 10/1994 |
| JP | 07-159901 | 6/1995 |
| JP | A-08-220519 | 8/1996 |
| JP | A 10-83029 | 3/1998 |
| JP | A-2000-131768 | 5/2000 |
| JP | A 2002-139799 | 5/2002 |
| JP | A 2002-174860 | 6/2002 |
| JP | 2002-221759 | 8/2002 |
| JP | A 2003-050307 | 2/2003 |
| JP | A-2003-121609 | 4/2003 |
| JP | A 2004-117574 | 4/2004 |

* cited by examiner

Primary Examiner—Christopher E. Mahoney
(74) Attorney, Agent, or Firm—Oliff & Berridge, PLC

(57) ABSTRACT

A screen that transmits a light according to an image signal includes a flat surface, a plurality of light-guide portions arrayed on the flat surface, and a plurality of lens elements. The light-guide portions have a light incident side and an output side. The plurality of lens elements are provided on the flat surface opposite the incident side of the light-guide portions. The lens elements focus the light according to the image signal. Each of the plurality of light-guide portions has a taper form such that a cross section of each of the light-guide portions gradually reduces from the incident side of the output side thereof.

5 Claims, 12 Drawing Sheets

F I G. 1
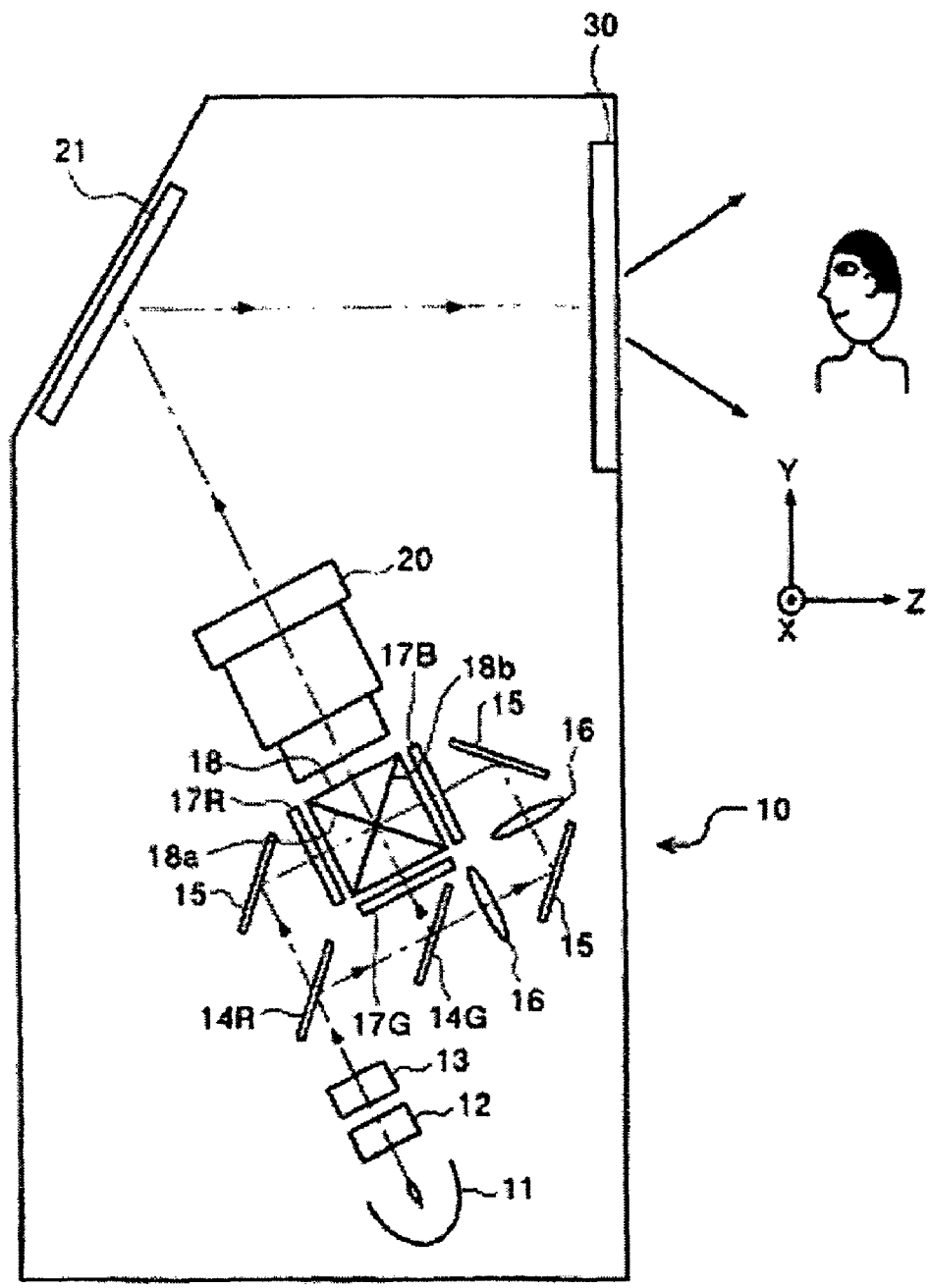

F I G. 2
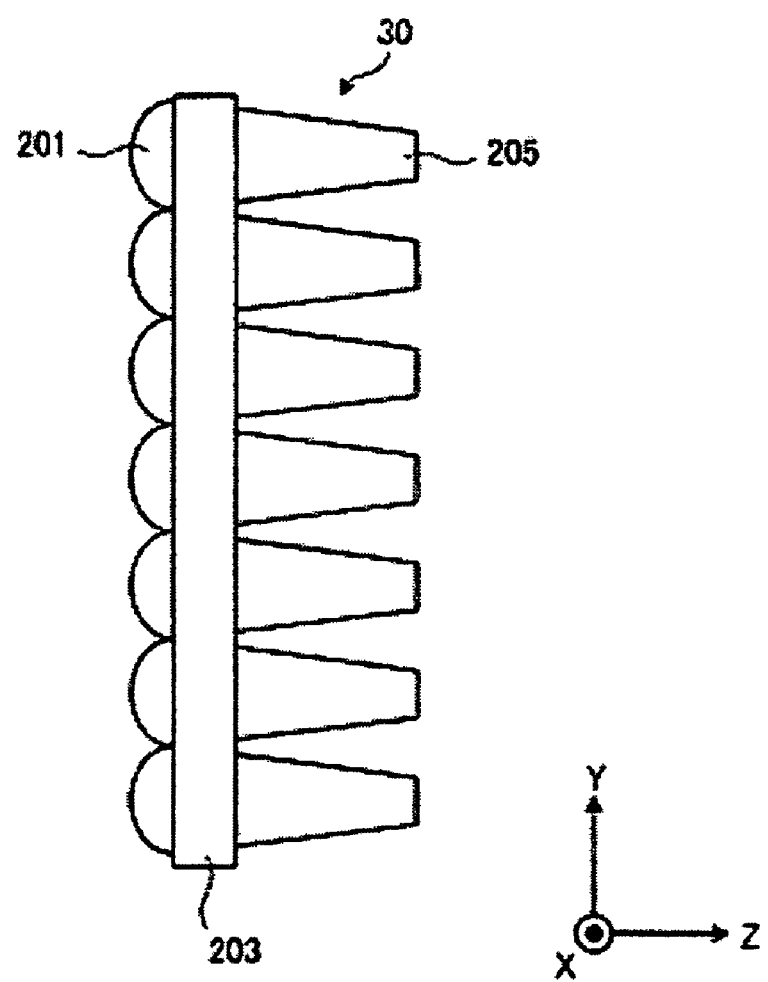

F I G. 4
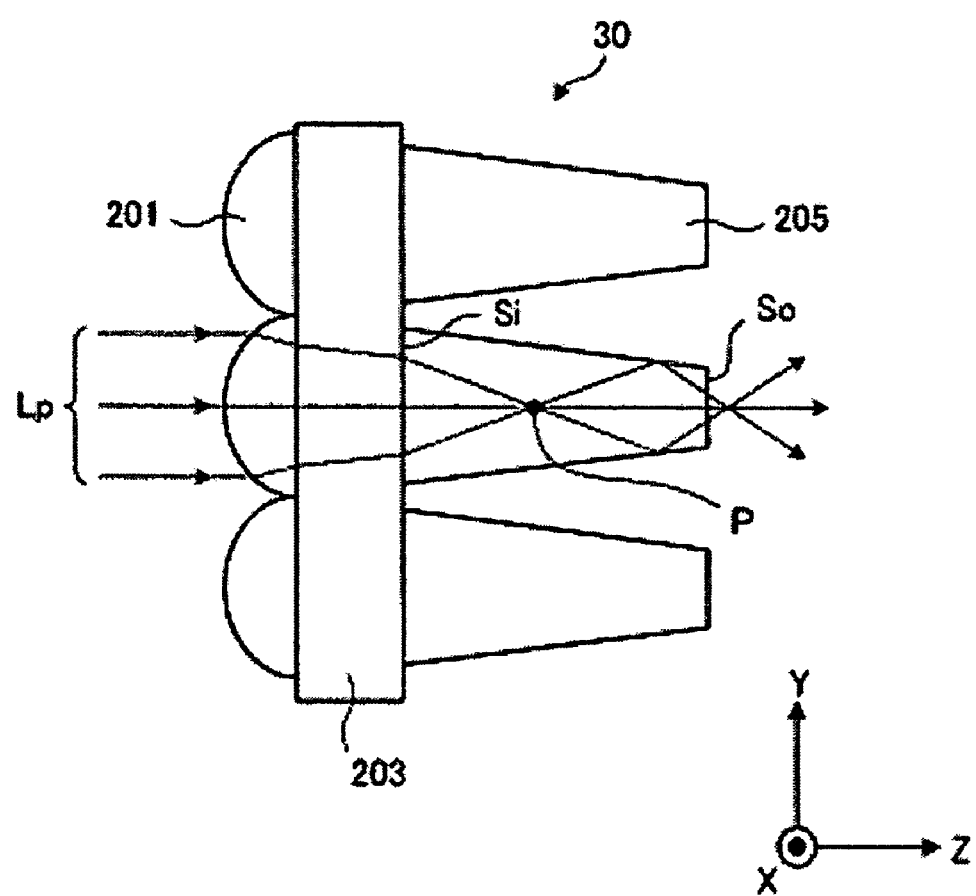

F I G. 5
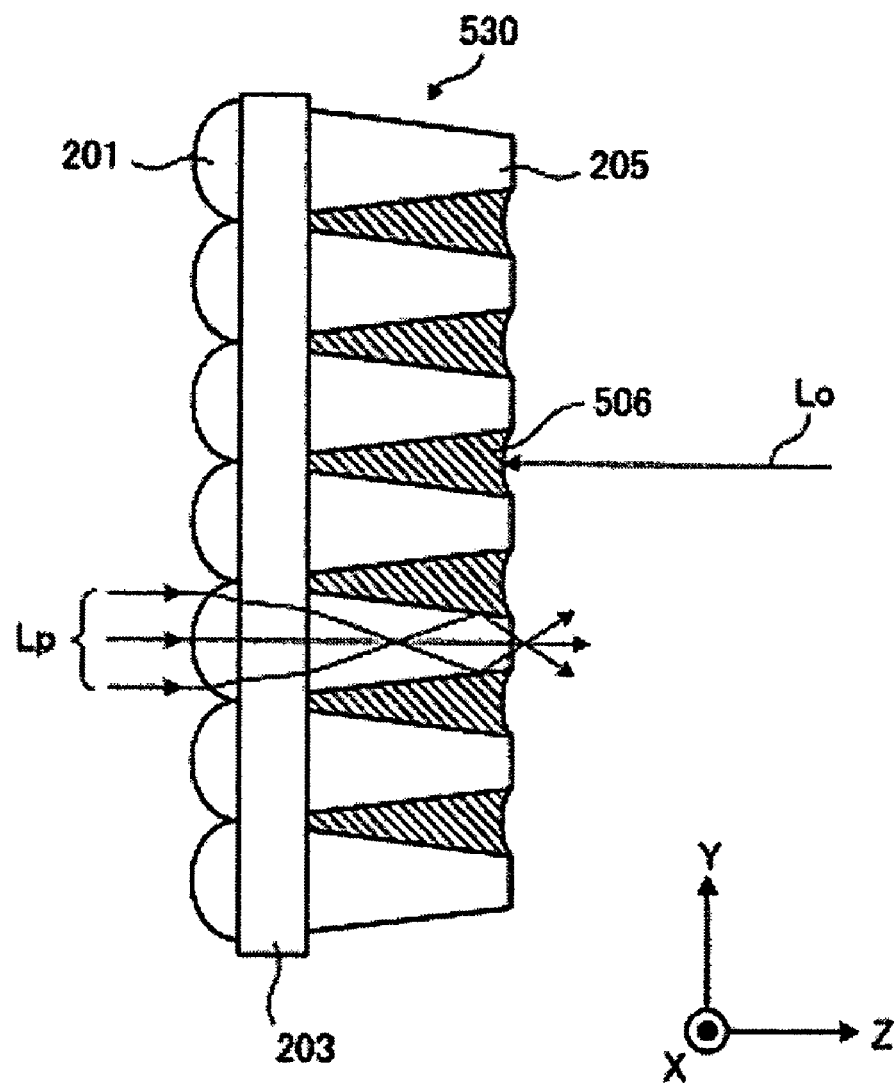

F I G. 6
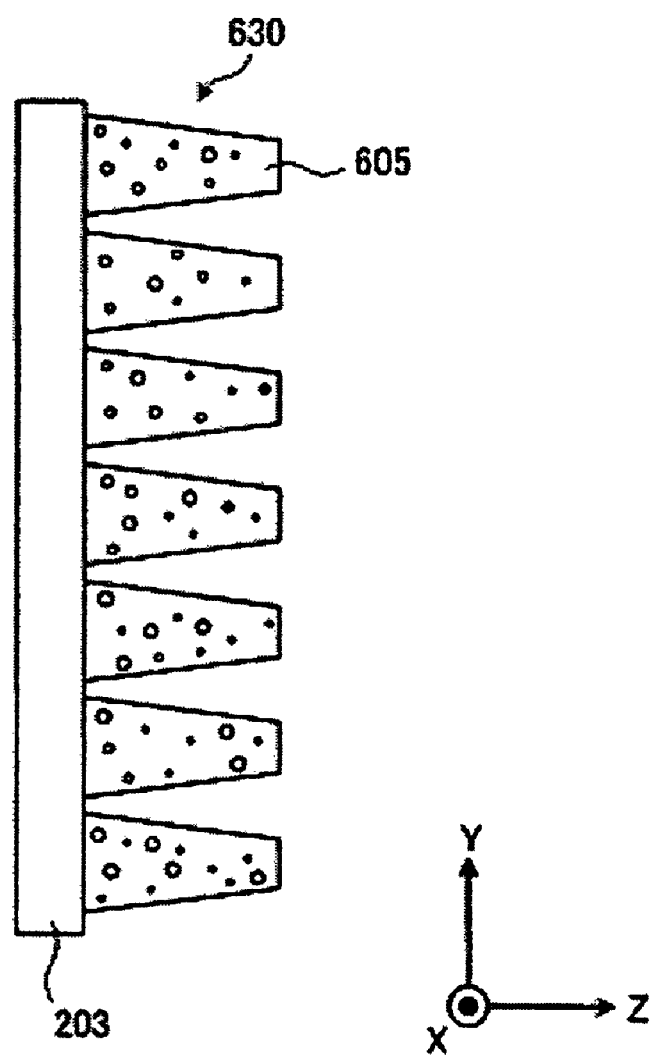

F I G. 7
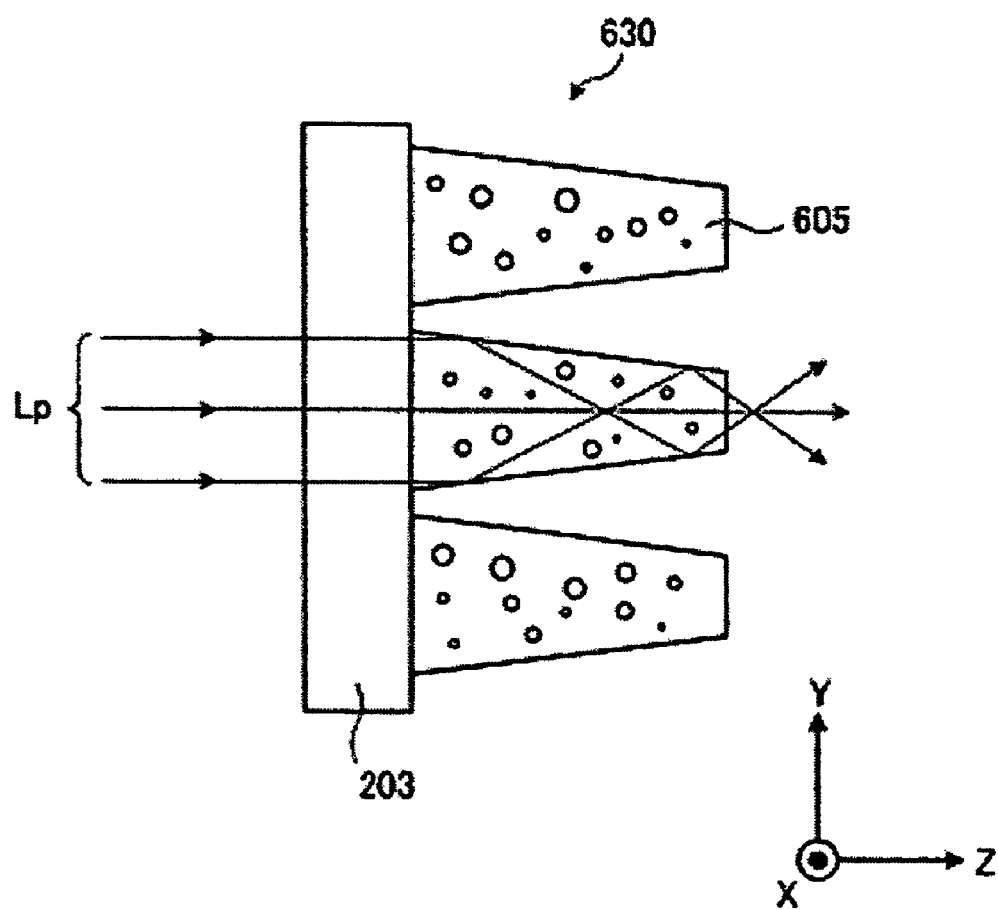

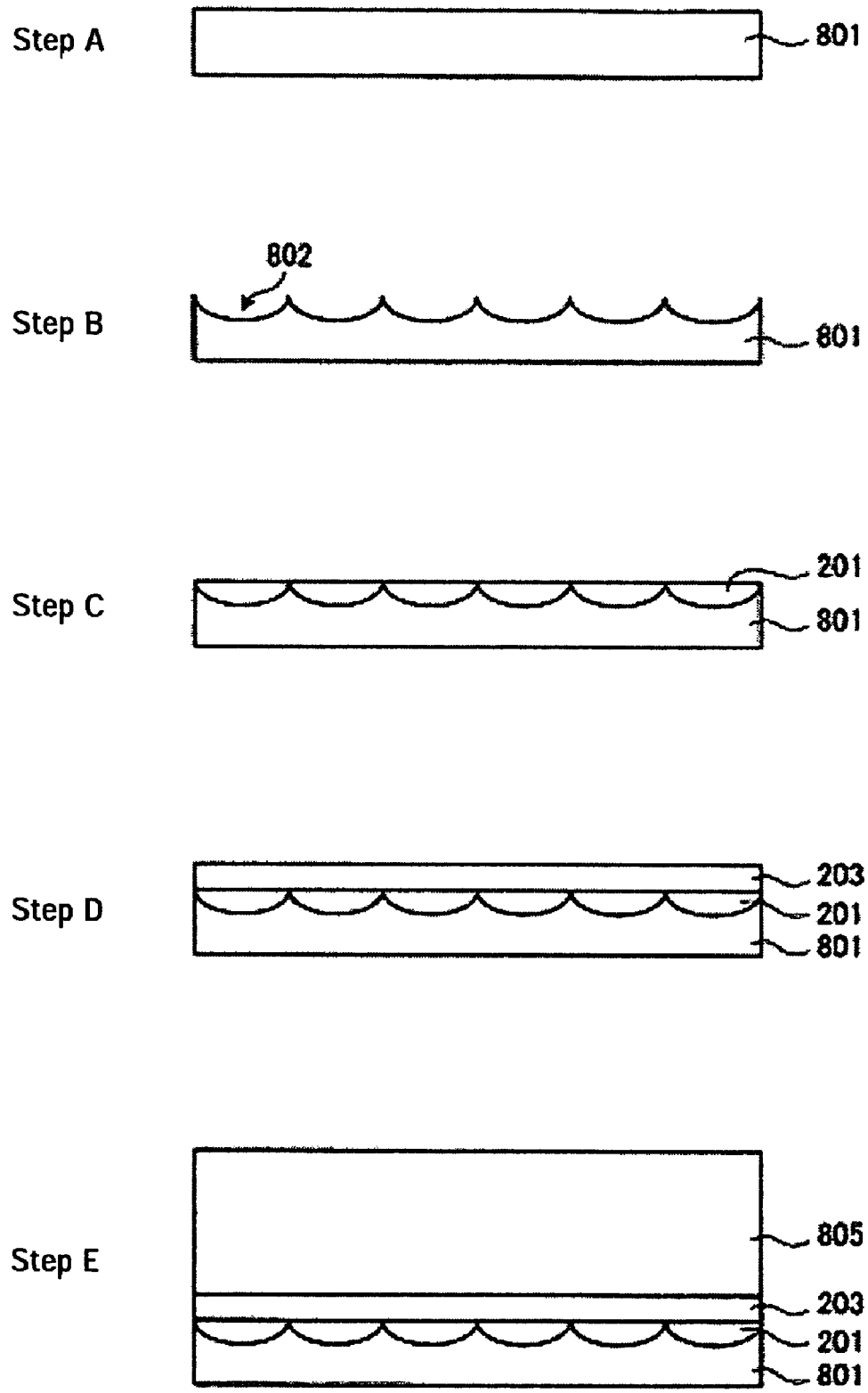

FIG. 11-2
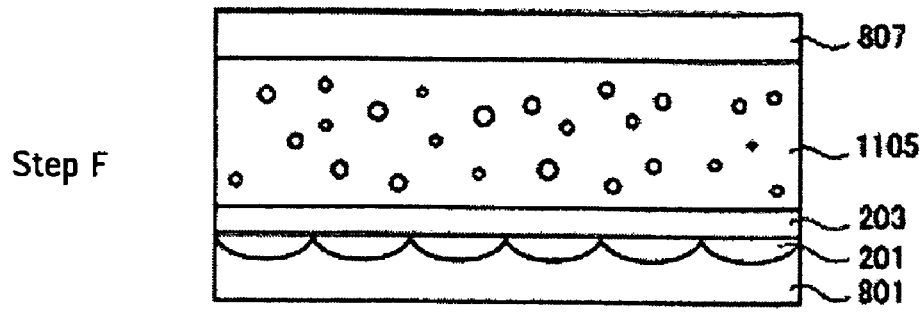
Step F
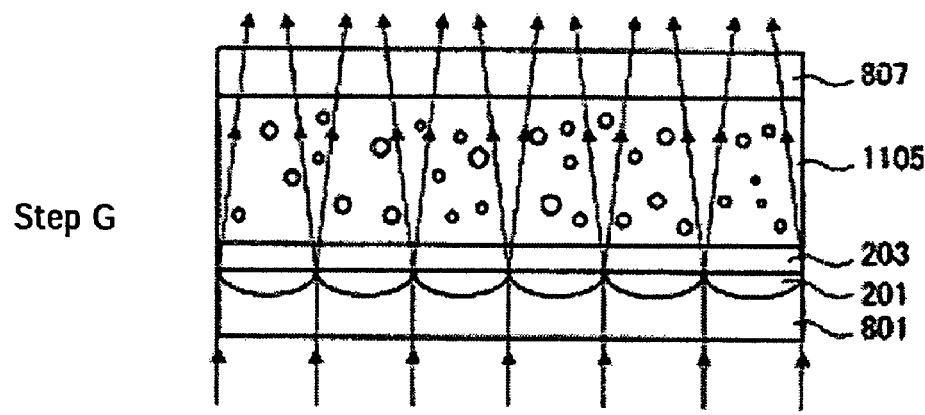
Step G
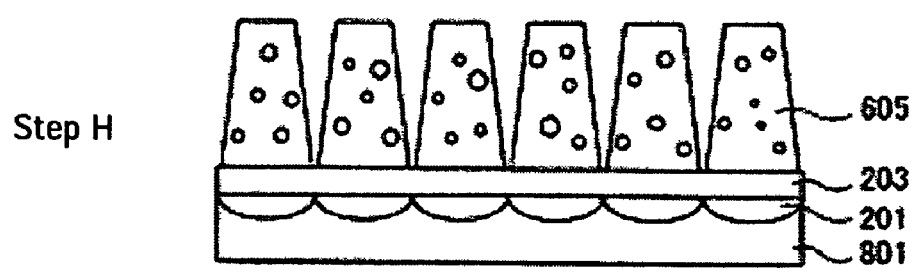
Step H
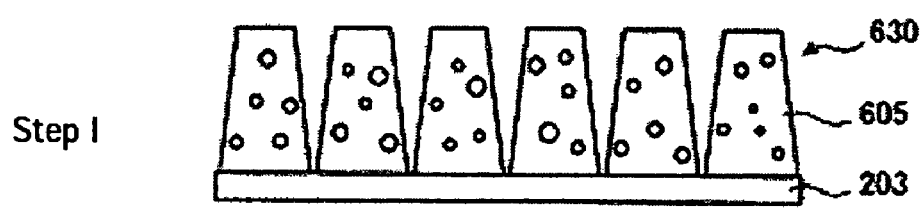
Step I

SCREEN, MANUFACTURING METHOD OF SCREEN, AND PROJECTOR

This application claims the benefit of Japanese Patent Application No. 2004-311859, filed Oct. 27, 2004. The entire disclosure of the prior application is hereby incorporated by reference herein in its entirety.

BACKGROUND

The exemplary embodiments relate to a screen, a method of manufacturing the screen, and a projector. More specifically, the exemplary embodiments relate to a screen-related technology suitable for a projector that displays an image when a light is transmitted through it according to an image signal.

In a rear projector that displays an image when light is passing through it according to an image signal, a transmission-type screen that transmits light is used. In the related art, projectors have been improved in their optical systems to have higher-definition and enhanced brightness. When the enhancements in definition and brightness are further advanced, scintillation may occur because the lights according to an image signal interfere with each other. Scintillation can be a factor in degrading the image quality because it produces a bright portion and a dark portion in an image regardless of an image signal thereof. The technique to reduce the occurrence of scintillation has been proposed in Japanese Patent Application Publications JP-A-2002-174860 and JP-A-2002-139799.

In the related art, scintillation can be reduced by increasing the extent of diffusion of light in a screen. For example, as disclosed by JP-A-2002-174860, scintillation in a screen can be reduced by adjusting the content of a diffusion material or the thickness of a diffusion layer. However, increasing the extent of diffusion of light in a screen causes mutual overlapping of picture elements, degrading the resolution of a projected image. Thus, the enhancement of image definition and the reduction in scintillation are incompatible, and as such, it is difficult to achieve a high quality image.

In contrast, according the technique disclosed by JP-A-2002-139799, the enhancement of image definition and the reduction in scintillation can be compatible. In order to achieve a high-definition image, a fine-scale light guide must be formed. However, it is difficult to manufacture a screen that incorporates a fine-scale light guide even with the technique disclosed by the JP-A-2002-139799. Further, JP-A-2002-139799 does not disclose a configuration for the reduction in scintillation and improvement of viewing angle characteristic.

SUMMARY

It is an advantage of the exemplary embodiments to provide a screen, which makes the reduction in scintillation and the enhancement of image definition compatible and has a good viewing angle characteristic. Also, it is an advantage of the exemplary embodiments to provide a screen manufacturing method, by which the screen can be readily manufactured. Further, it is an advantage of the exemplary embodiments to provide a projector in which the screen is incorporated.

In order to address or resolve these and other problems, and provide advantages, the exemplary embodiments provide a screen that transmits a light according to an image signal, which includes a flat surface; a plurality of light-guide portions arrayed on the flat surface, the plurality of light guide portions each having an incident side upon which the light according to the image signal is incident and having an output side, each of the plurality of light-guide portions having a taper form such that a cross section of each of the plurality of light-guide portions gradually reduces from the incident side toward the output side; and a plurality of lens elements provided on the incident side of the plurality of light-guide portions, the plurality of lens elements focusing the light according to the image signal.

The light according to the image signal passes through the light-guide portions, each of which has a taper form. The light that has entered each light-guide portion undergoes total reflection at an interface of the light-guide portion and then emerges from an output surface of the light-guide portion. The light-guide portions are isolated from one another, whereby the interferences among lights output from the different light-guide portions can be reduced. In addition, light is sufficiently diffused inside the light-guide portions. Thus, the occurrence of scintillation can be reduced. When the light-guide portions are isolated from each other, the overlapping of picture elements due to the mix of lights output from the light-guide portions can be reduced or prevented. Further, the degradation of resolution can be reduced or minimized. Therefore, by providing such light-guide portions, an image higher in definition and a reduction of the scintillation of the image are compatible.

By using the light-guide portions each having a taper form such that a cross section of each light-guide portion gradually reduces from the incident side of light toward the output side thereof, the light subjected to total reflection at an interface of each light-guide portion can be made to travel within a wide range of angles. The lens element concentrates the light according to an image signal and forces the light to extend into the corresponding light-guide portions. Providing the lens elements enables diffusion of the light according to an image signal at a desired angle. In addition, the diffusion of the light according to an image signal leads to the reduction in occurrence of scintillation. Thus, a screen that makes compatible the reduction in scintillation and the enhancement of image definition compatibility and has a good viewing angle characteristic, can be obtained.

In an exemplary embodiment according to an aspect of the invention, each lens element forms a focal point at a location in the light-guide portion that is closer to the lens element than the output surface of the light-guide portion. As a result of setting a focal point of each lens element at a location in the light-guide portion closer to the lens element than the output surface of the light-guide portion, the total reflection of the light according to an image signal at an interface of the light-guide portion is possible. Also, the total reflection of the light according to an image signal at an interface of the light-guide portion enables the diffusion of the light according to an image signal. This makes it possible to obtain a screen having a good viewing angle characteristic.

Further, according to an exemplary embodiment, a screen that transmits a light according to an image signal, having a flat surface and a plurality of light-guide portions arrayed on the flat surface, can be provided. The plurality of light guide portions have an incident side upon which light according to the image signal is incident and have an output side. Each of the plurality of light-guide portions include a diffusion material that diffuses light, and each light-guide portion has a taper form such that a cross-section of each light-guide portion gradually reduces from the incident side toward the output side.

The light according to an image signal is diffused while passing through the light-guide portions containing a diffusion material. The light that has entered each light-guide portion undergoes total reflection at an interface of the light-guide portion and then emerges from the output surface of the light-guide portion. The interferences among lights output from the light-guide portions can be reduced by isolating the light-guide portions from one another. The reduction in interferences among the lights according to an image signal can reduce the occurrence of scintillation. Also, the overlapping of picture elements due to the mix of lights output from the light-guide portions can be prevented, whereby the degradation of resolution can be made smaller. By providing light-guide portions containing a diffusion material, the enhancement of image definition and the reduction in scintillation can be compatible. Also, a desired viewing angle characteristic can be achieved by the light-guide portions containing a diffusion material. Thus, the reduction in scintillation and the enhancement of image definition can be compatible, whereby a screen having a good viewing angle characteristic can be obtained.

Furthermore, in regard to an exemplary embodiment according to the invention, the screen has a light-absorbing portion. The light-absorbing portion is provided between the light-guide portions and absorbs a light, other than the light according to an image signal. As a result of providing the light-absorbing portion, reduction of the reflection of an extraneous light in the screen, and a reduction of deterioration in image contrast is possible. In the related art, a technique to provide black stripes on a screen by which light-blocking layers and opening portions are alternately disposed in order to reduce the reflection of an extraneous light have been used. However, it is considered that such a screen with black stripes is prone to cause scintillation because light is concentrated in an opening in a stripe form. In contrast, the screen according to the exemplary embodiments can achieve both the reduction in reflection of an extraneous light and the reduction in scintillation. Further, by providing a light-absorbing portion among the light-guide portions, it is possible to reliably prevent interferences among the lights passing through the light-guide portions. As a result, a screen that enables the reduction in scintillation and the deterioration in image contrast can be obtained.

According to an exemplary embodiment, it is possible to provide a method of manufacturing a screen, including: forming a concave portion in a transparent layer composed of a first transparent member; filling the concave portion with a second transparent member to form a lens element, the second transparent member having a refractive index different from a refractive index of the first transparent member;

forming a photosensitive resin layer on a side of the transparent layer where the lens element is formed;

exposing the photosensitive resin layer with a light entering the photosensitive resin layer through the lens element from a side of the transparent layer; removing an unexposed portion of the photosensitive resin layer to form a light-guide portion; and removing the transparent layer. The focusing effect of the lens element is utilized to expose the photosensitive resin layer, whereby a light-guide portion in a desired form can be easily formed. Further, the lens element used in the exposure can be used as a constituent element of the screen, which can eliminate the need for alignment of the lens element and the light-guide portion. Especially, even in the case where a fine-scale light-guide portion is used, the manufacture of a screen is made remarkably easier in comparison to the case of using a related art device such as a metal mold. Thus, a screen that can have a compatible reduction in scintillation and enhancement of image definition can be manufactured readily.

Also, according to an exemplary embodiment, it is possible to provide a method of manufacturing a screen, including: forming a concave portion in a transparent layer composed of a first transparent member; filling the concave portion with a second transparent member to form a lens element, the second transparent member having a refractive index different from a refractive index of the first transparent member;

forming a photosensitive resin layer on a side of the transparent layer where the lens element is formed;

exposing the photosensitive resin layer with entering the photosensitive resin layer through the lens element from a side of the transparent layer; removing an unexposed portion of the photosensitive resin layer to form a light-guide portion; and removing the lens element together with the transparent layer. The focusing effect of the lens element is utilized to expose the photosensitive resin layer, whereby a light-guide portion in a desired form can be easily formed. Even in the case where a fine-scale light-guide portion is used, the manufacture of a screen is made remarkably easier in comparison to the case of using a related art device such as a metal mold. Thus, a screen with a reduction in scintillation and enhancement of image definition can be manufactured readily.

Further, in an exemplary embodiment, the second transparent member has a refractive index larger than that of the first transparent member. Use of a lens element having a refractive index larger than a refractive index of the transparent layer enables the photosensitive resin layer to be exposed by the light that forms a focal point in a space located on the output side when viewed from the lens element. Since the focal point is formed in a space located on the output side when viewed from the lens element, it is possible to form a light-guide portion in a taper form such that a cross section of the light-guide portion gradually reduces from an incident side toward an output side. Further, where the lens element used in the exposure is used as a constituent element of the screen, a focal point of the lens element can be set at a location in the light-guide portion closer to the lens element than to the output surface of the light-guide portion by removing only the transparent layer. This makes it possible to manufacture a screen having a good viewing angle characteristic.

Still further, in an exemplary embodiment, it is possible to provide a projector, including: a light source unit that supplies a light; a spatial light modulator that modulates the light from the light source unit according to an image signal; and a screen that transmits the light from the spatial light modulator. The screen has a flat surface, a plurality of light-guide portions arrayed on the flat surface, the plurality of light-guide portions having an incident side upon which the light according to the image signal is incident and having an output side, each of the plurality of light-guide portions having a taper form such that a cross section of each of the plurality of light-guide portions gradually reduces from the incident side toward the output side thereof; and a plurality of lens elements provided on the flat surface opposite the incident side of the plurality of light-guide portions, the plurality of lens elements focusing the light according to the image signal. By using the screen, the reduction in scintillation and the enhancement of image definition are both possible, and a good viewing angle characteristic can be achieved. Therefore, a projector, with the reduction in scintillation and the enhancement of image definition, and which has a good viewing angle characteristic can be achieved.

Moreover, according to an exemplary embodiment, it is possible to provide a projector, including a light source unit that supplies a light; a spatial light modulator that modulates the light from the light source unit according to an image signal; and a screen that transmits the light from the spatial light modulator. The screen including a flat surface, and a plurality of light-guide portions arrayed on the flat surface. The plurality of light-guide portions contain a diffusion material that diffuses the light. The plurality of light-guide portions each having an incident side upon which the light according to an image signal is incident and having an output side. The light guide portions further having a taper form such that a cross section of each of the plurality of light-guide portions gradually reduces from the incident side toward the output side. By using the screen, the reduction in scintillation and the enhancement of image definition is made possible. Further, a good viewing angle characteristic can be achieved. Therefore, a projector, which makes the reduction in scintillation and the enhancement of image definition compatible and which has a good viewing angle characteristic, can be achieved.

BRIEF DESCRIPTION OF THE DRAWINGS

The exemplary embodiments will be described with reference to the accompanying drawings, wherein like numbers reference like elements, and wherein:

FIG. 1 is a schematic illustrating a projector according to a first exemplary embodiment of the invention;

FIG. 2 is a schematic illustrating an important part of a screen in an exemplary embodiment of the invention;

FIG. 4 is a schematic illustrating a behavior of light in a screen in an exemplary embodiment of the invention;

FIG. 5 is a schematic illustrating an important part of a screen according to a second exemplary embodiment of the invention;

FIG. 6 is a schematic illustrating an important part of a screen according to a third exemplary embodiment of the invention;

FIG. 7 is a schematic illustrating the behavior of light in a screen in an exemplary embodiment of the invention;

FIG. 8-1 is a schematic illustrating a method of manufacturing a screen according a fourth exemplary embodiment of the invention;

FIG. 8-2 is a schematic illustrating the method of manufacturing a screen according to the fourth exemplary embodiment of the invention;

FIG. 11-1 is a schematic illustrating a method of manufacturing a screen according a fifth exemplary embodiment of the invention; and FIG. 11-2 is a schematic further illustrating the method of manufacturing the screen according to the fifth exemplary embodiment of the invention.

DETAILED DESCRIPTION OF THE EMBODIMENTS

Exemplary embodiments of the invention will be described below in detail with reference to the drawings.

First Exemplary Embodiment

Figures 1, 11:
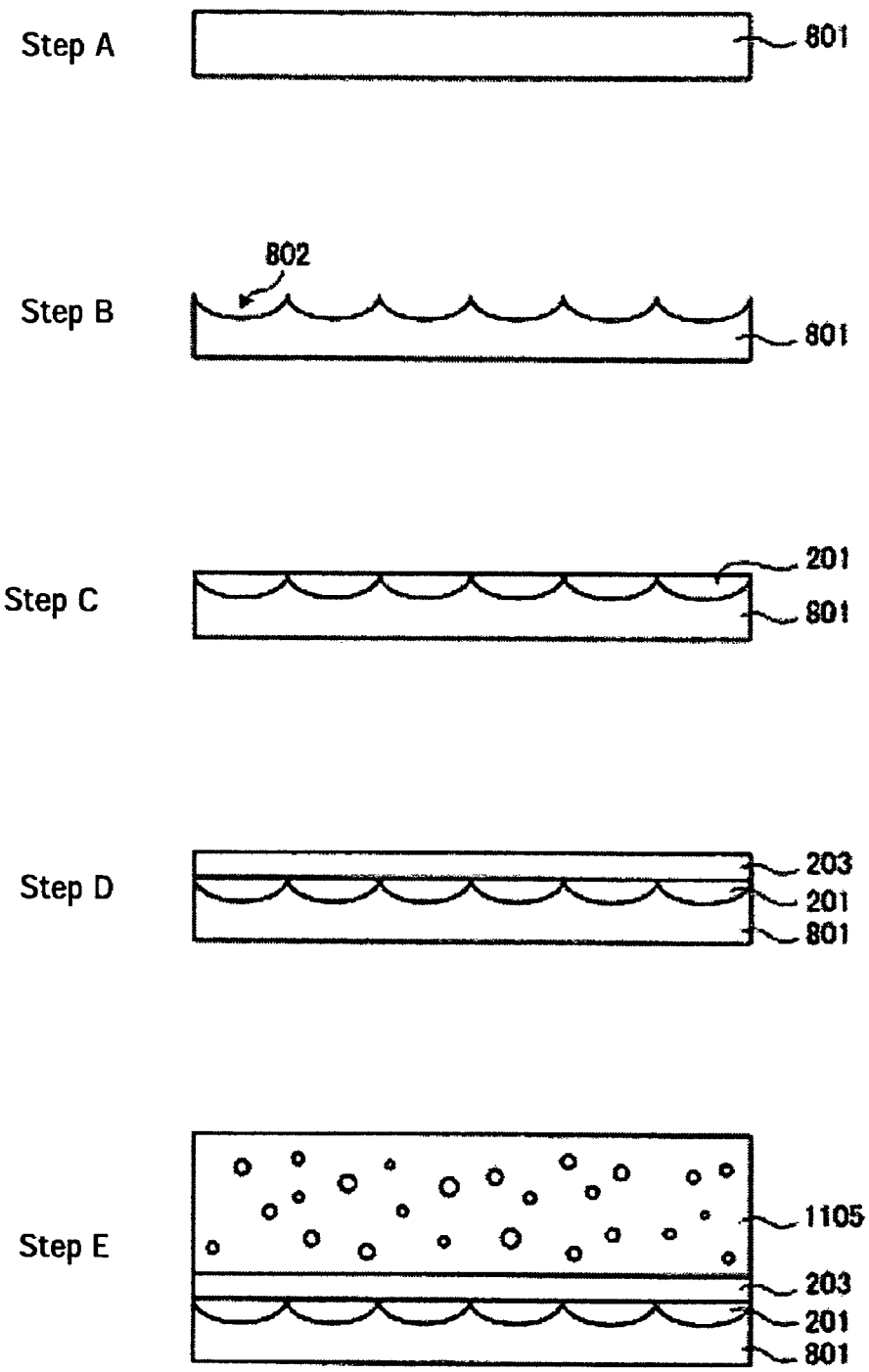

FIG. 1 illustrates a schematic configuration of a projector 10 as a first exemplary embodiment according to the invention. The projector 10 of the exemplary embodiments is a rear projector, with which an image is seen by projecting light onto one face of the screen 30 and observing the light emerging from the other face of the screen 30. The extra-high-pressure mercury vapor lamp 11, which is a light source unit, supplies a light containing a red color light (hereinafter referred to as "R light") as a first color light, a green light (hereinafter referred to as "G light") as a second color light, and a blue light (hereinafter referred to as "B light") as a third color light.

The integrator 12 substantially uniforms the distribution of illumination intensity of the light coming from the extra-high-pressure mercury vapor lamp 11. The uniform light, in illumination intensity distribution, is converted into a polarized light having a particular vibrational direction, e.g. s-polarized light, by the polarizer element 13. The light resulting from the conversion into s-polarized light enters the R-light-transmissive dichroic mirror 14R, included in a color separation system. The R-light-transmissive dichroic mirror 14R transmits an R light and reflects G and B lights. The light that has passed through the R-light-transmissive dichroic mirror 14R enters a reflection mirror 15. The reflection mirror 15 bends the optical path of the R light to a 90-degree angle. The R light with its bent optical path goes into the spatial light modulator 17R that modulates the R light according to an image signal. The spatial light modulator 17R is a transmission-type liquid crystal display device that modulates an R light according to an image signal. The polarization direction of light is not changed even when the light passes through a dichroic mirror, and therefore the R light incident on the spatial light modulator 17R remains an s-polarized light.

The s-polarized light incident on the spatial light modulator 17R is converted into a p-polarized light, and then enters a liquid crystal panel (not shown). The liquid crystal panel includes: two transparent substrates; and a liquid crystal layer for image display that is sealed in between the substrates. The p-polarized light incident on the liquid crystal panel is converted into an s-polarized light through modulation according to an image signal. Then, the spatial light modulator 17R lets out the R light resulting from the conversion into s-polarized light through the modulation. The R light, modulated by the spatial light modulator 17R in this way, enters the cross dichroic prism 18, which is a color light combining system.

The G and B lights reflected by the R-light-transmissive dichroic mirror 14R are bent in their optical paths to a 90-degree angle. The G and B lights, whose optical paths have been bent, enter the B-light-transmissive dichroic mirror 14G. The B-light-transmissive dichroic mirror 14G reflects the G light and transmits the B light. The G light reflected off the B-light-transmissive dichroic mirror 14G goes into the spatial light modulator 17G in which the G light is modulated according to an image signal. The spatial light modulator 17G is a transmission-type liquid crystal display device that modulates a G light according to an image signal.

The G light that will enter the spatial light modulator 17G has been converted into an s-polarized light. The s-polarized light incident on the spatial light modulator 17G goes into a liquid crystal panel as it is. The s-polarized light incident on the liquid crystal panel is subjected to the modulation according to an image signal and converted into a p-polarized light. The spatial light modulator 17G lets out the G light resulting from the conversion into p-polarized light through the modulation. The G light, modulated by the spatial light modulator 17G in this way, enters the cross dichroic prism 18.

The B light that has passed through the B-light-transmissive dichroic mirror 14G goes through two relay lenses 16 and two reflection mirrors 15, into the spatial light modulator 17B that modulates the B light according to an image signal. The spatial light modulator 17B is a transmission-type liquid crystal display device that modulates the B light according to an image signal. The B light is forced to pass through the relay lenses 16 so that the B light is longer in optical path relative to the R and G lights. Use of the relay lenses 16 allows the B light to be guided to the spatial light modulator 17B, as it is, after passing through the B-light-transmissive dichroic mirror 14G.

The B light that enters the spatial light modulator 17B has been converted into an s-polarized light. The s-polarized light incident on the spatial light modulator 17B is converted into a p-polarized light, and then goes into a liquid crystal panel. The p-polarized light incident on the liquid crystal panel is converted into an s-polarized light through modulation according to an image signal. The spatial light modulator 17B lets out the B light resulting from the conversion into s-polarized light through the modulation. The B light, thus modulated in the spatial light modulator 17B, enters the cross dichroic prism 18, which is a color light combining system. The R-light-transmissive dichroic mirror 14R and B-light-transmissive dichroic mirror 14G, which constitute a color separation system, separate light supplied by the extra-high-pressure mercury vapor lamp 11 into R, G and B lights.

The cross dichroic prism 18, i.e. color light combining system, is formed by arranging two dichroic filters 18a and 18b so as to decussate. The dichroic filter 18a reflects B light and transmits R and G lights. The dichroic filter 18b reflects R light and transmits B and G lights. The cross dichroic prism 18 thus combines the R, G and B lights, which are modulated in the spatial light modulators 17R, 17G and 17B, respectively.

The lights that will be let in the cross dichroic prism 18 through the spatial light modulators 17R and 17B are set to be s-polarized lights. Further, the light that will be let in the cross dichroic prism 18 through the spatial light modulator 17G is set to be a p-polarized light. Lights different in polarization direction are thus let in the cross dichroic prism 18, whereby lights that are let out from the individual color spatial light modulators can be effectively combined in the cross dichroic prism 18. The dichroic filters 18a, 18b may be superior in reflecting capability with respect to an s-polarized light. Hence, the R and B lights that will be reflected by the dichroic filters 18a, 18b are s-polarized lights, and the G light that will pass through the dichroic filters 18a, 18b is a p-polarized light.

The projector lens 20 projects the light resulting from the combination in the cross dichroic prism 18 toward the reflection mirror 21. The reflection mirror 21 reflects a projected light form the projector lens 20 toward the screen 30. The screen 30 has a Fresnel lens (not shown) on the incident side thereof. The Fresnel lens converts an incident light into a substantially collimated light and outputs the resultant light. Providing the Fresnel lens allows the light according to an image signal to be changed in angle toward a person watching an image. The screen 30 is a transmission-type screen that transmits a light according to an image signal thereby to display a projected image on a face of the screen on the side of the screen in which a person is watching an image.

Figures 2, 8:
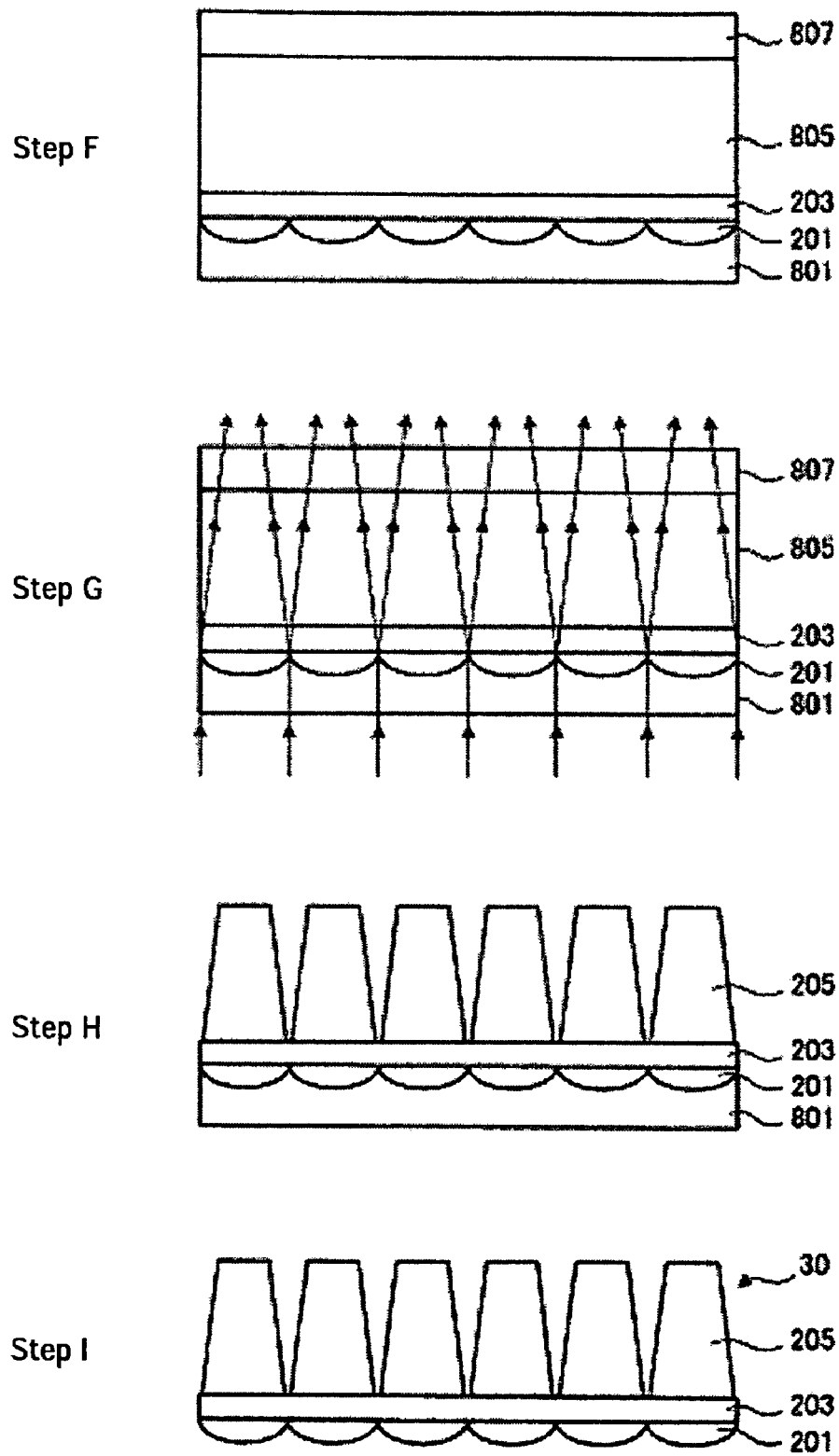

FIG. 2 illustrates a cross-section configuration of an important part of the screen 30. The screen 30 has a substrate 203, a plurality of lens elements 201, and a plurality of light-guide portions 205, in which the lens elements and light-guide portions are formed on the substrate 203. The substrate 203, lens elements 201 and light-guide portions 205 are each configured of an optically transparent glass or resin member. For example, the lens elements 201, substrate 203 and light-guide portions 205 are configured of members having nearly the same refractive indexes.

The light-guide portions 205 are provided on one face of the substrate 203, on the side of the substrate in which a person watching an image is located, i.e. on the plus Z side when XYZ coordinates are defined as shown in FIG. 2. In addition, the light-guide portions 205 are arrayed in a matrix on the substrate 203 extending in X and Y directions. Each of the light-guide portions 205 is in the form of a frustum of r a circular cone, illustrated as a trapezoid in FIG. 2. To prevent the degradation of image resolution, the light-guide portions 205 are provided on the screen 30, so as to have a size smaller than that of a picture element. For example, three light-guide portions 205 in each of X and Y directions, namely nine light-guide portions in total, may be provided for each picture element in the screen 30. Also, it is preferable that the light-guide portions 205 are arrayed with a pitch such that the light-guide portions correspond to the picture elements in the screen 30.

Figure 3:
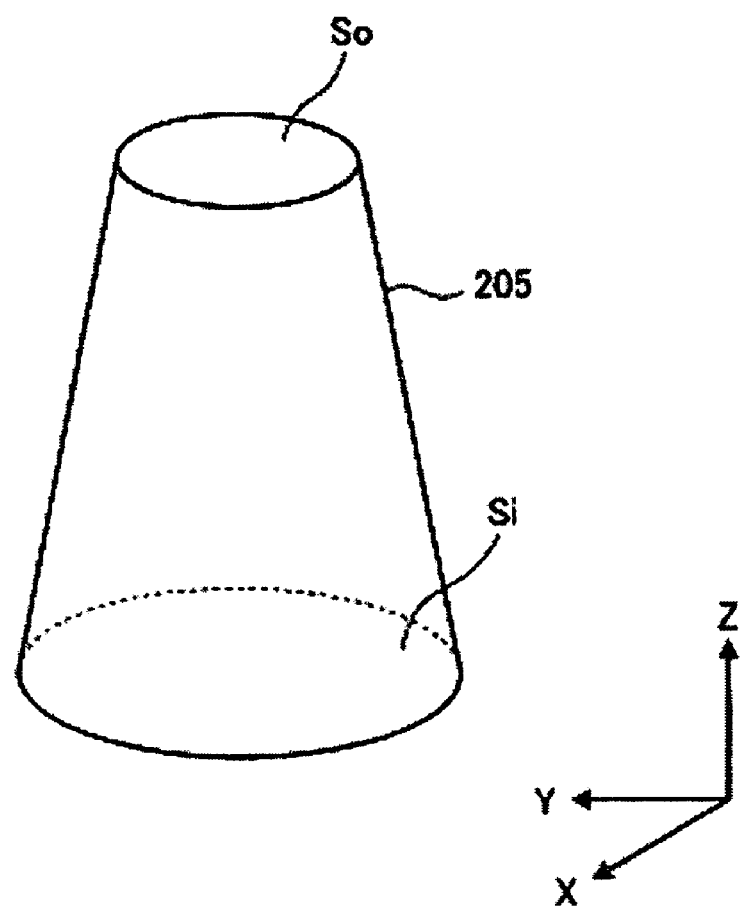
FIG. 3 is a schematic illustrating a light-guide portion in an exemplary embodiment of the invention.

FIG. 3 illustrates the light-guide portion 205. The light-guide portion 205 has the form of a frustum of a circular cone as shaped by cutting a conical solid body with a bottom face $S_i$ with a plane So substantially in parallel with the face $S_i$. The face $S_i$ is an incident surface where the light according to an image signal impinges on the light-guide portion 205. The face $S_o$ is an output surface from which the light according to an image signal emerges. The incident surface $S_i$ and output surface $S_o$ are in a substantially circular form. Each light-guide portion 205 is shaped so that the area of the incident surface $S_i$ is larger than that of the output surface $S_o$. In other words, the light-guide portion 205 is in a taper form such that its cross section gradually reduces from the incident side toward the output side of the light according to an image signal.

Referring again to FIG. 2, the plurality lens elements 201 are provided on the other face of the substrate 203, on the side nearer to the reflection mirror 21 (see FIG. 1), i.e. on the minus Z side. The plurality lens elements 201 are located on the incident side of the plurality light-guide portions 205 with the substrate 203 interposed between the lens elements and light-guide portions. Each of the lens elements 201 is a microlens in an aspherical or spherical form, illustrated as a part of an elliptical form in FIG. 2. Each lens element 201, and the corresponding light-guide portion 205, are disposed so that their central axes, i.e. centers of rotational symmetry, substantially coincide with each other.

The face of each lens element 201 in contact with the substrate 203 is in a substantially circular form, which coincides in form with the incident surface $S_i$ of each light-guide portion 205. The lens elements 201 are provided so as to correspond to the light-guide portions 205, as described above. Further, the lens elements 201 are arrayed in a matrix on the substrate 203 extending in X and Y directions, like the light-guide portions 205. The face of each lens element 201, in contact with the substrate 203, does not have to have substantially the same form as that of the incident surface $S_i$ of the light-guide portion 205, and may be in a different form.

Referring to FIG. 4, the behavior of a light Lp according to an image signal in the screen 30 will now be described. The light Lp is changed in angle with a Fresnel lens (not shown) in the direction of a person watching an image, i.e. toward Z axis, and then goes into the lens element 201. The lens element 201 causes the light Lp traveling in a Z axis direction to be focused on a point P in the light-guide portion 205. The point P is the backside focal point of the lens element 201. The focal length of the lens element 201 is shorter than a total distance of the thickness of the substrate 203 and the height of the light-guide portion 205, in the Z direction. Of light rays that constitute the light Lp, one that impinges on an interface of the light-guide portion 205 at an angle larger than a critical angle undergoes total reflection at the interface of the light-guide portion 205 and then emerges from the output surface $S_o$.

The light-guide portions 205 are isolated from each other, whereby the interferences among lights output from the different light-guide portions 205 can be reduced. In addition to this, lights are sufficiently diffused insides the light-guide portions 205. Thus, the occurrence of scintillation can be reduced. When the light-guide portions 205 are isolated from each other, the overlapping of picture elements, due to the mix of lights output from the light-guide portions 205, can be prevented, and further, the degradation of resolution can be made smaller. Therefore, by providing such light-guide portions 205, the following are compatible: a higher definition image; and a reduction of the scintillation of the image.

The light Lp is changed in angle by the lens element 201 so that the angle that the light Lp forms with Z axis is made larger. Also, each light-guide portion 205 is in a taper form such that its cross section gradually reduces from the incident surface $S_i$ to the output surface $S_o$. As such, the light that will be subjected to total reflection at an interface of the light-guide portion 205 is changed in angle so as to form a larger angle with the Z axis. The light Lp can be diffused within a particular range of angles when it is changed in angle so as to form a larger angle with the Z axis. The light Lp repeatedly undergoes the total reflection at an interface of the light-guide portions 205, whereby it is made possible to uniformize and output the light Lp.

As described above, use of the light-guide portions 205 allows the screen 30 to supply a uniform light within a desired range of angles. In addition, the diffusion of the light Lp can reduce the occurrence of scintillation. This can offer the advantages of making the reduction in scintillation and the enhancement of image definition compatible, and providing a good viewing angle characteristic. Moreover, the light-guide portions 205 make it possible to set a range of angles at which the light according to an image signal can be diffused using the slope of the interface. The longer the form of the light-guide portions 205 extending in Z axis direction, i.e. toward a person watching an image, the more uniform the light according to an image signal can be made. The form of the light-guide portions 205 is not limited to the frustum of the circular cone formed by cutting a top of a conical solid body, but may be another taper form such that its cross section gradually reduces from the incident side of the light toward the output side. The light-guide portions 205 may be varied in form so as to further improve the diffusion characteristic thereof.

Second Exemplary Embodiment

FIG. 5 illustrates an important part of the screen 530 in a second exemplary embodiment according to the invention. The screen 530 is applicable to the projector 10 of the first exemplary embodiment. The same parts as that of the projector 10 of the first exemplary embodiment are identified by the same reference characters and the description thereof is therefore omitted. The screen 530 of the second exemplary embodiment is characterized by having a light-absorbing portion 506. The light-absorbing portion 506 is provided between the light-guide portions 205. The light-absorbing portion 506 absorbs an extraneous light Lo, other than the light Lp according to an image signal. The extraneous light Lo is, for example, an illuminated light coming from a lighting apparatus, or sunlight, or the like. The light-absorbing portion 506 is made from, for example, a light-absorbent resin.

As a result of providing the light-absorbing portion 506, a reflection of the extraneous light Lo by the screen 530 may be reduced; and the deterioration in image contrast may be reduced or minimized. In the related art, in order to reduce the reflection of extraneous light, a screen has been provided with black stripes, which are composed of alternately disposed light-blocking portions and opening portions (see JP-A-10-83029). A screen with black stripes used therein is regarded as being prone to cause scintillation because light tends to concentrate into the openings of the stripes.

In the second exemplary embodiment, the reflection of extraneous light is reduced according to the areal ratio of the light-guide portions 205 to the light-absorbing portion 506 viewed from a person watching an image as in the related art screen with black stripes, in which the reflection of extraneous light is reduced according to the areal ratio of the light-blocking portions to the opening portions. Also, in the second exemplary embodiment, the light-absorbing portion 506 is provided together with the light-guide portions 205 and as such, both the reductions in the reflection of extraneous light Lo and in the occurrence of scintillation can be reduced. Further, the light-absorbing portion 506 is provided between the light-guide portions 205, which makes it possible to reliably prevent the interferences among lights passing through the light-guide portions 205. This poses the following advantages. The first is that scintillation can be reduced. The second is that the deterioration in image contrast can be made smaller even under the extraneous light Lo.

Other advantages provided by the screen 530 in connection with the second exemplary embodiment are as follows. In a related art screen with black stripes, a lens array is provided for concentrating lights according to an image signal into the opening portions. As such, the light, after passing through a lens element in the array, can go into a light-blocking portion when aberration arises in the lens element. In contrast, the screen 530 of the second exemplary embodiment enables the light according to an image signal to surely go into a light-guide portion 205 even when aberration occurs in a lens element 201. Further, in the case where light-blocking portions are provided inside a screen, as in the related art screen with black stripes, the scattering of extraneous light inside the screen could cause the deterioration in contrast. However, in the case where a light-absorbing portion 506 is provided on a surface of a screen 530, as practiced in the second exemplary embodiment, the scattering of extraneous light in the screen 530 can be reduced or prevented, and therefore the deterioration in contrast can be reduced.

Third Exemplary Embodiment

FIG. 6 illustrates an important part of a screen 630 as a third exemplary embodiment according to the invention. The screen 630 in the third exemplary embodiment may be used with the projector 10 according to the first exemplary embodiment. The same parts as that of the projector 10 of the first exemplary embodiments are identified by the same reference character and the description thereof is therefore omitted. The screen 630 of this exemplary embodiment is characterized in that each light-guide portion 605 includes a diffusion material. The diffusion material included in the light-guide portion 605 may have a member different in refractive index from the member that constitutes the light-guide portion 605. The diffusion material is dispersed in the light-guide portion 605 in the form of fine particles.

FIG. 7 illustrates the behavior of a light Lp according to an image signal in the screen 630. The screen 630 has a substrate 203 and light-guide portions 605 provided on one face of the substrate 203 on the side of the screen in which a person is watching an image, as in the case of the first exemplary embodiment. The light-guide portions 605 are the same in configuration as the light-guide portions 205 in the first exemplary embodiment except that they include the diffusion material. However, unlike the first exemplary embodiment, lens elements 201 are not provided in the screen 630 in this third exemplary embodiment. Therefore, the light Lp substantially collimated by a Fresnel lens (not shown) passes through the substrate 203 and then directly goes into the light-guide portion 605.

The light Lp travels inside the light-guide portion 605 in a Z direction and then undergoes total reflection at an interface of the light-guide portion 605. When the light Lp is subjected to total reflection at the interface of the light-guide portion 605, it is changed in angle so as to form a larger angle with the Z axis. As in the case of the first exemplary embodiment, when the light Lp is changed in angle so as to form a larger angle with Z axis, the light Lp is diffused within a particular range of angles. Further, as a result of providing the light-guide portions 605, it becomes possible to make the enhancement of image definition and the reduction in scintillation compatible, as in the case of the first exemplary embodiment.

In addition, the light Lp that has entered the light-guide portion 605 is diffused by the diffusion material. Use of light-guide portions 605 containing the diffusion material allows the screen 630 to provide a desired viewing angle characteristic. This can offer the advantages of: making the reduction in scintillation and the enhancement of image definition compatible; and providing a good viewing angle characteristic. Although, the lens elements are omitted in this exemplary embodiment, the lens elements may be used, as in the first exemplary embodiment. In addition, the light-guide portions 605 are not limited to the configuration in which they contain a diffusion material. Instead, the light-guide portions may be configured of only transparent members containing no diffusion material. Even in this case, the enhancement of image definition and the reduction in scintillation are compatible with each other.

In a projector in association with the third exemplary embodiment of the invention, an extra-high-pressure mercury vapor lamp is used as a light source unit, but this is not a requirement. For example, a solid-state, light-emitting device such as a light-emitting diode (LED) may be used. This projector does not have to be a three-plate type projector in which three transmission-type liquid crystal display devices are provided, and it may be a projector with a reflection type liquid crystal display device or a projector with a tilt mirror device.

Fourth Exemplary Embodiment

FIGS. 8-1, 8-2 illustrate a method of manufacturing a screen in a fourth exemplary embodiment according to the invention. In the fourth exemplary embodiment, it is possible to manufacture the screen 30 of the first exemplary embodiment. The same parts as that in the first exemplary embodiment are identified by the same reference character and the description thereof is therefore omitted. As shown in FIG. 8-1, a set of concave portions 802 is first formed on a surface of a transparent layer 801 in Step A and Step B, which are steps for formation of a set of concave portions. The transparent layer 801 is composed of a first transparent member. While the set of concave portions 802 is formed on a surface of the transparent layer 801 in an array, such set of concave portions 802 can be formed by e.g. a photolithography process. As a photomask used in the photolithography process, e.g. a gray-scale mask can be used.

Then, in Step C, which is a step for formation of a set of lens elements, the concave portions 802 are filled with a second transparent member different from the first transparent member, thereby forming a set of lens elements 201. In Step D, a substrate 203 is stacked on the set of lens elements 201. Next, in Step E, which is a step for formation of a photosensitive resin, a photosensitive resin layer 805 is formed. The photosensitive resin layer 805 is provided on the substrate 203 on one side of the transparent layer 801, where the set of lens elements 201 are formed.

The photosensitive resin layer 805 can be formed by stacking a photo-hardening resin in the form of a sheet. A negative type photosensitive resin may be used as the photo-hardening resin in the form of a sheet. The negative type photosensitive resin consists of a sheet-shaped base of a transparent resin and a light-absorbent pigment or dye contained in the sheet-shaped base. Also, the photosensitive resin layer 805 may be formed by applying a photo-hardening resin in a liquid condition over the substrate 203. In the case of using a photo-hardening resin in liquid form, the photosensitive resin layer 805 is formed by applying the photo-hardening resin and then prebaking it.

Subsequently, as shown in FIG. 8-2, at Step F, a substrate 807 is stacked on the photosensitive resin layer 805. The substrate 807 is composed of a transparent member, like the substrate 203 lying between the set of lens elements 201, and the photosensitive resin layer 805. And, in Step G, which is a step for exposure, the photosensitive resin layer 805 is exposed. Light extends from the side of the transparent layer 801, through the set of lens elements 201, and enters the photosensitive resin layer 805. The light that has entered from the side of the transparent layer 801 is focused by the set of lens elements 201. As a result, an area of the photosensitive resin layer 805 is exposed, which is symmetric about an extension of the central axis of each lens element 201 and whose size measured in a plane orthogonal to the central axis becomes gradually smaller as the plane is shifted from the incident side of the resin layer toward the output side thereof.

The light that has entered the transparent layer 801 is focused so as to form a focal point at a place on the output side, farther than the photosensitive resin layer 805, relative to the transparent layer 801. Therefore, in the exposure step, a portion of the photosensitive resin layer 805 in the form of a frustum of a circular cone is selectively hardened due to the focusing effect of each lens element 201. Further, the light used in the exposure step may be any kind of light as long as it is capable of hardening the photosensitive resin layer 805, and therefore, visible light or ultraviolet light may be used.

Next, in Step H, which is a step for formation of light-guide portions, the light-guide portions 205 are formed by removing a portion of the photosensitive resin layer 805, except the portions that have been exposed in the exposure step. The removal of the unexposed portion of the photosensitive resin layer 805 is carried out by immersing the photosensitive resin layer 805 in a developer and then developing it. When the photosensitive resin layer 805 is immersed in the developer, only an unexposed portion of the photosensitive resin layer 805 is dissolved. Thus, only the exposed portions of the photosensitive resin layer 805 remain, whereby the light-guide portions 205 are formed. Finally, in Step I, which is a step for removal of the transparent layer, the transparent layer 801 is removed, and then the manufacture of the screen 30 is completed.

Figure 9:
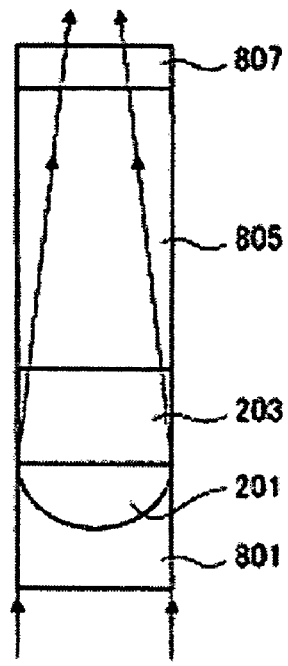
FIG. 9 is a schematic illustrating a travel of light in an exposure step in an exemplary embodiment of the invention.

FIG. 9 illustrates the travel of light in the exposure step. The second transparent member that the set of lens elements 201 is composed of has a refractive index larger than that of the first transparent member that the transparent layer 801 is composed of. When the set of lens elements 201 is larger in refractive index than the transparent layer 801, it becomes possible to cause the light having passed through the transparent layer 801 to focus so that the light forms a focal point at a place on the output side, farther than the photosensitive resin layer 805, relative to the transparent layer 801. Thus, it becomes possible to form a set of light-guide portions 205 each having a taper form such that its cross section gradually reduces from the incident side of the light, according to an image signal, toward an output side thereof.

Figure 10:
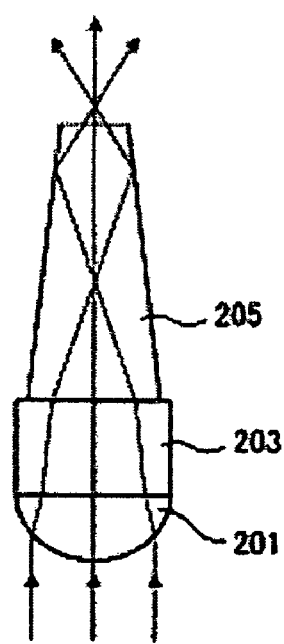
FIG. 10 is a schematic illustrating travel of light after a transparent layer is removed in an exemplary embodiment of the invention.

Typically, a transparent member of glass, or the like, has a refractive index larger than one (1). In the condition where the transparent layer 801 is removed in the step for removal of the transparent layer, the light incident on each lens element 201 is refracted at an incident surface of the lens element 201, as shown in FIG. 10. When the light is refracted at the incident surface of the lens element 201, a focal length of the lens element 201 can be made shorter than that in the case of the exposure step shown in FIG. 9. In this way, it is possible to set a focal point of each lens element 201 at a place nearer to the lens element 201 than the output surface of the corresponding light-guide portion 205 in the screen 30. This allows a screen 30 to be manufactured with a good viewing angle characteristic.

According to the fourth exemplary embodiment, the exposure of the photosensitive resin layer 805 is performed utilizing the focusing effect of the set of lens elements 201, whereby a set of light-guide portions 205 having a desired form can be formed easily. Especially, even when the set of light-guide portions 205 is fine in size, the formation of such set of light-guide portions is made remarkably easier in comparison to the case of using a related art device such as a metal mold. This offers an advantage in that it becomes possible to easily manufacture a screen 30, where the reduction in scintillation and the enhancement of image definition are compatible. In addition, the light that has passed through the set of lens elements 201 is used to form the set of light-guide portions 205, and as such, the screen 30 can be manufactured without performing fine and precise alignment of the lens elements 201 and light-guide portions 205. Further, when a light-absorbing portion is formed between the light-guide portions 205, the screen 530 of the second exemplary embodiment (see FIG. 5) can be manufactured. Also, even with the screen 530 with the light-absorbing portion 506, the alignment of the light-absorbing portion 506 with respect to other components is not required and therefore it can be easier to manufacture.

Fifth Exemplary Embodiment

FIGS. 11-1 and 11-2 illustrate a method of manufacturing a screen in a fifth exemplary embodiment according to the invention. In the fifth exemplary embodiment, the screen 630 of the third exemplary embodiment can be manufactured. The same parts as those in the third exemplary embodiment are identified by the same reference character and the description thereof is therefore omitted. Steps A to D shown in FIG. 11-1 are the same as Steps A to D of the fourth exemplary embodiment, respectively. In the fifth exemplary embodiment, in Step E, which is a step for formation of a photosensitive resin layer, a photosensitive resin layer 1105, having a diffusion material dispersed therein, is formed.

Also, Steps F to H shown in FIG. 11-2 are the same as Steps F to H in the fourth exemplary embodiment, respectively. However, in this fifth exemplary embodiment, in Step I, which is a step for lens element removal, the set of lens elements 201 is removed together with the transparent layer 801, and then the manufacture of the screen 630 is completed. Also, in this fifth exemplary embodiment, the second transparent member that the set of lens elements 201 is composed of has a refractive index larger than that of the first transparent member of which the transparent layer 801 is composed of, as in the fourth exemplary embodiment. Thus, it becomes possible to form a set of light-guide portions 205 each having a taper form such that its cross section gradually reduces from the incident side of the light according to an image signal toward an output side thereof. Therefore, this fifth exemplary embodiment can also facilitate manufacturing a screen 630 that makes the reduction in scintillation and the enhancement of image definition compatible.

As described above, a screen according to exemplary embodiments is useful for a projector that displays an image when the light according to an image signal is transmitted.

What is claimed is:

1. A screen that transmits a light according to an image signal, comprising:
   a flat surface;
   a plurality of light-guide portions arrayed on the flat surface, the plurality of light-guide portions each having an incident side upon which the light according to the image signal is incident and having an output side, each of the plurality of light-guide portions having a taper form such that a cross section of each of the plurality of light-guide portions gradually reduces from the incident side toward the output side thereof; and
   a plurality of lens elements provided on the incident side of the flat surface opposite the plurality of light-guide portions, the plurality of lens elements focusing the light according to the image signal,
      each of said plurality of lens elements focusing the light according to the image signal at a location in each of respective corresponding light-guide portions, the location being nearer to a respective lens element than a respective output surface of each of the respective light-guide portions.

2. The screen of claim 1, further comprising:
   a light-absorbing portion that is provided between the plurality of light-guide portions and absorbs a light other than the light according to an image signal.

3. A projector, comprising:
   a light source unit that supplies a light;
   a spatial light modulator that modulates the light from the light source unit according to an image signal; and
   a screen that transmits the light from the spatial light modulator,
   the screen including,
      a flat surface,
      a plurality of light-guide portions arrayed on the flat surface, the plurality of light-guide portions each having an incident side upon which the light according to the image signal is incident and having an output side, each of the plurality of light-guide portions having a taper form such that a cross section of each of the plurality of light-guide portions gradually reduces from the incident side toward the output side; and
      a plurality of lens elements provided on the flat surface opposite the incident side of the plurality of light-guide portions, the plurality of lens elements focusing the light according to the image signal, each of said plurality of lens elements focusing the light according to the image signal at a location in each of respective corresponding light-guide portions, the location being nearer to a respective lens element than a respective output surface of each of the respective light-guide portions.

4. A screen that transmits a light according to an image signal, comprising:

a flat surface;

a plurality of light-guide portions arrayed on the flat surface, the plurality of light guide portions having an incident side upon which the light according to the image signal is incident and having an output side, each of the plurality of light-guide portions including a diffusion material that diffuses the light, and each of the plurality of light-guide portions having a taper form such that a cross section of each of the plurality of light-guide portions gradually reduces from the incident side toward the output side thereof; and a plurality of lens elements provided on the flat surface opposite the incident side of the plurality of light-guide portions, the plurality of lens elements focusing the light according to the image signal, each of said plurality of lens elements focusing the light according to the image signal at a location in each of respective corresponding light-guide portions, the location being nearer to a respective lens element than a respective output surface of each of the respective light-guide portions.

5. A projector, comprising:

a light source unit that supplies a light;

a spatial light modulator that modulates the light from the light source unit according to an image signal; and a screen that transmits the light from the spatial light modulator, the screen including, a flat surface;

a plurality of light-guide portions arrayed on the flat surface, the plurality of light-guide portions containing a diffusion material that diffuses the light, and the plurality of light-guide portions each having an incident side upon which the light according to the image signal is incident and having an output side, each of the plurality of light-guide portions having a taper form such that a cross section of each of the plurality of light-guide portions gradually reduces from the incident side toward the output side thereof; and a plurality of lens elements provided on the flat surface opposite the incident side of the plurality of light-guide portions, the plurality of lens elements focusing the light according to the image signal, each of said plurality of lens elements focusing the light according to the image signal at a location in each of respective corresponding light-guide portions, the location being nearer to a respective lens element than a respective output surface of each of the respective light-guide portions.

* * * * *